United States Patent [19]
Tanaka

[11] Patent Number: 5,656,125
[45] Date of Patent: Aug. 12, 1997

[54] PHOTOGRAPHIC FILM SPLICER AND METHOD OF SPLICING PHOTOGRAPHIC FILMS

[75] Inventor: Katsuhiko Tanaka, Kanagawa, Japan

[73] Assignee: Fuji Photo Film Co., Ltd., Kanagawa, Japan

[21] Appl. No.: 425,804

[22] Filed: Apr. 20, 1995

[30] Foreign Application Priority Data

Apr. 28, 1994 [JP] Japan ................................. 6-091087

[51] Int. Cl.⁶ .................................................. B32B 31/18
[52] U.S. Cl. ........................... 156/361; 156/157; 156/502; 156/505
[58] Field of Search ..................... 156/64, 157, 159, 156/304.3, 378, 361, 502, 505, 506, 580, 581, 583.1, 583.4

[56] References Cited

U.S. PATENT DOCUMENTS

| | | | |
|---|---|---|---|
| 4,024,302 | 5/1977 | Takagi et al. | 427/290 |
| 4,046,614 | 9/1977 | Zahn et al. | 156/353 |
| 4,067,760 | 1/1978 | Nelson | 156/157 |
| 4,401,504 | 8/1983 | Kobayashi | 156/505 |
| 4,411,725 | 10/1983 | Siegel et al. | 156/353 |
| 4,540,456 | 9/1985 | Kaida et al. | 156/159 |
| 4,834,306 | 5/1989 | Robertson et al. | 242/71.1 |
| 4,846,413 | 7/1989 | Inoue | 241/236 |
| 5,164,031 | 11/1992 | Matsuyama et al. | 156/157 |
| 5,405,470 | 4/1995 | Held | 156/159 |

FOREIGN PATENT DOCUMENTS 337645  2/1991  Japan .

*Primary Examiner*—James Sells
*Attorney, Agent, or Firm*—Sughrue, Mion, Zinn, Macpeak & Seas

[57] ABSTRACT

A splicer for joining, by hot-melt adhesive tape, a trailing end portion of a first photographic film and a leading end portion of another photographic film with a predetermined interval therebetween. The splicer includes a head which heats the hot-melt adhesive tape and a pad. The trailing end portion and the leading end portion and the hot-melt adhesive tape are nipped at a predetermined pressure between the pad and the head. A concave portion is formed in the pad so as to oppose a portion of the hot-melt adhesive tape which portion is positioned at a gap between the trailing end portion and the leading end portion. Accordingly, the predetermined pressure is not applied to the portion of the hot-melt adhesive tape at the gap, and the portion does not adhere to the pad.

14 Claims, 12 Drawing Sheets

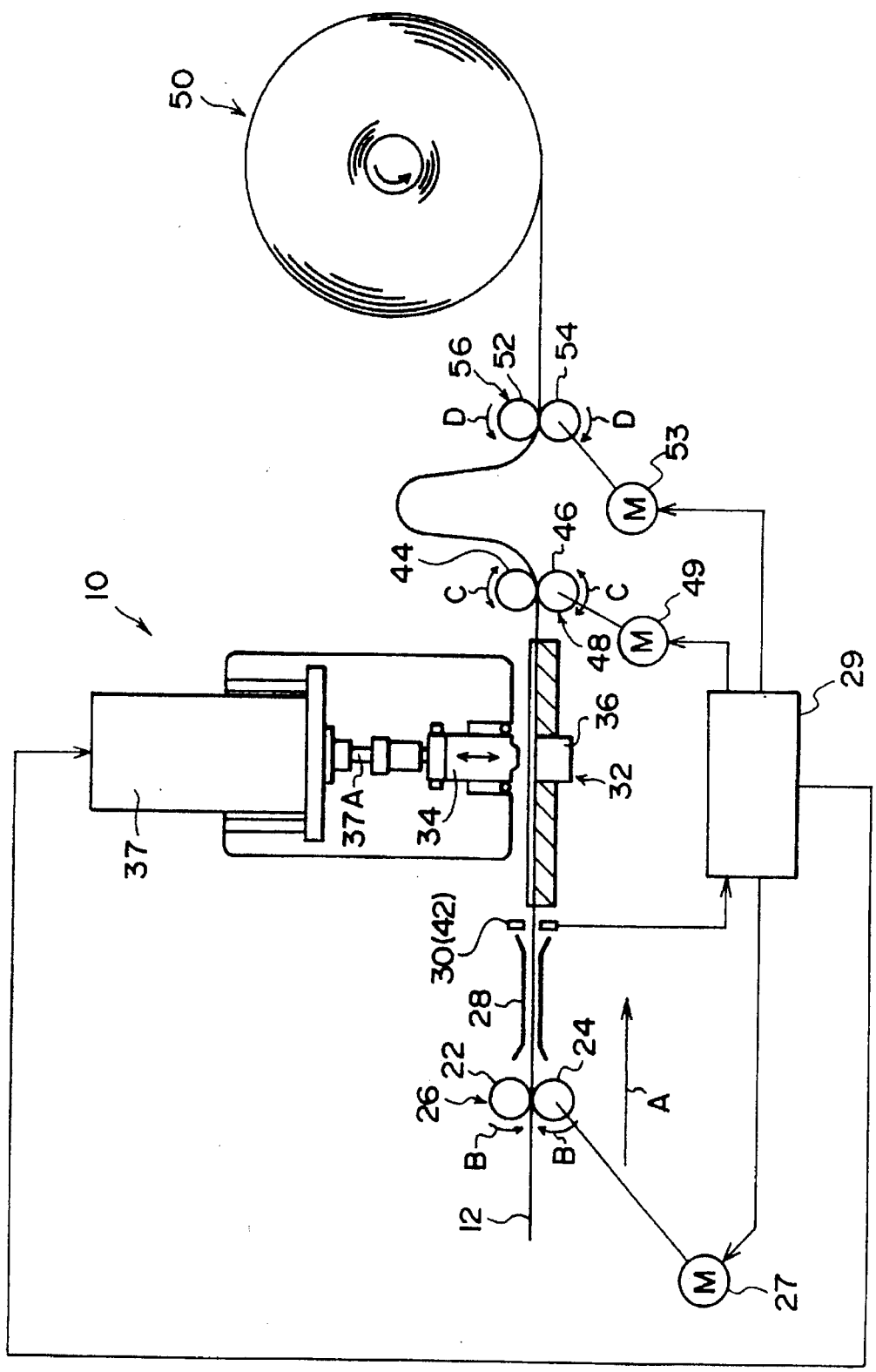

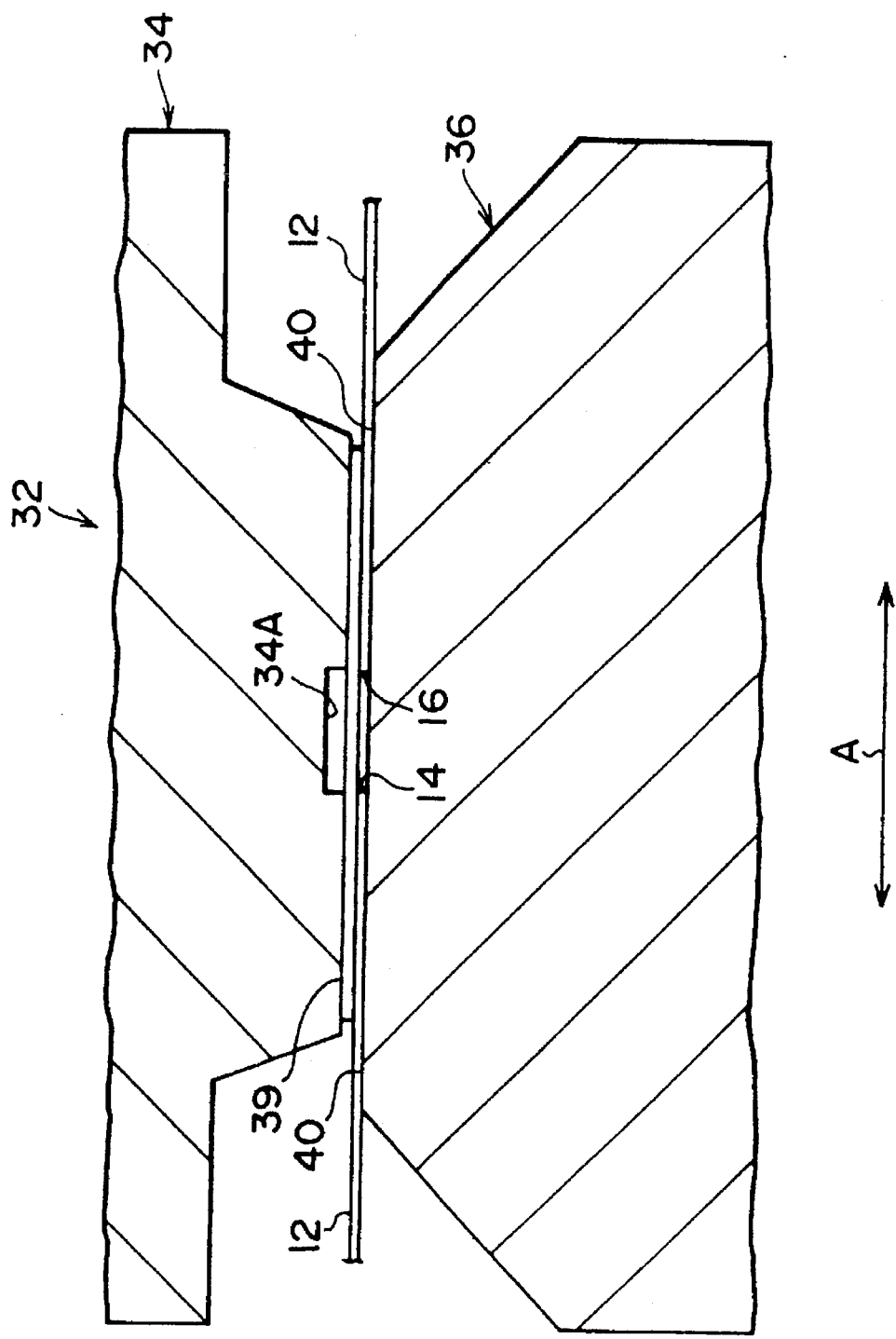

PHOTOGRAPHIC FILM SPLICER AND METHOD OF SPLICING PHOTOGRAPHIC FILMS

BACKGROUND OF THE INVENTION

1. Field of the Invention

The present invention relates to a photographic film splicer and a method of splicing photographic films in which leading and trailing ends of a plurality of photographic films are joined together by hot-melt adhesive tape, with predetermined intervals being provided between the joined leading and trailing ends, so as to form a longer connected body of a plurality of photographic films.

2. Description of the Related Art

Splicers are used in large-scale developing facilities in order to efficiently carry out developing processing, printing processing and the like. Approximately 50 to 100 films are joined by splicing tape so as to form an elongated body, and are processed in this state.

When processing of the films has been completed, the regions to which tape is adhered are removed and the elongated body is divided into the respective films. Each of the films is cut into a predetermined number of frames (e.g., six frames) such that piece negatives are formed. Thereafter, the piece negatives are accommodated in accommodating bodies known as negative sheets, and are returned to the customer in this state.

U.S. Pat. Nos. 4,834,306 and 4,846,413 and Japanese Patent Application Laid-Open No. 3-37645 have proposed a new type of photographic film cartridge in which the cartridge main body is formed as a resin molded product and in which the photographic film is delivered out to the exterior of the cartridge main body due to the rotation of a spool.

This new type of photographic film cartridge differs from its predecessors in that the leader portion of the photographic film does not protrude out from the cartridge main body either before the photographic film cartridge has been used or after the cartridge has been used. Accordingly, advantages are obtained in that the photographic film can be accommodated so as to be shielded from light even more than before, and the handling of the photographic film cartridge before and after use thereof is quite easy.

In order to enable reuse of this new type of photographic film cartridge, as opposed to cutting the trailing end portion as in the case of conventional 135 films, the trailing end of the photographic film is engaged with the spool within the cartridge main body, and the photographic film is separated from the cartridge by this engagement being canceled by a special jig used for such a purpose. As with conventional photographic films, it is preferable to join 50 to 100 of these separated photographic films by splicing tape so that processing thereof can be carried out efficiently.

Here, in order to return the processed or developed photographic film to the customer in a state in which the photographic film is rewound within the cartridge, it is necessary to maintain a specially-machined portion at the trailing end portion of the photographic film so that the trailing end portion can engage with the spool again.

However, as in conventional means, when the splicing tape adhered region of the photographic film for which processing has been completed is cut, the trailing end portion of the photographic film having such a specially-machined portion (i.e., a portion machined to allow engagement of the trailing end portion with the spool) is also cut. Accordingly, the trailing end portion cannot engage with the spool.

As a result, a desplicer has been proposed which is disposed between separatable photographic films and which does not cut the leading and trailing ends of two photographic films joined by splicing tape.

At this separating device, only the portion of the tape at a joining portion at which two photographic films are joined is nipped at a predetermined pressure. When the tape is heated and the paste melts, the films are pulled in directions of moving apart from the tape and are separated therefrom. Therefore, when such a separating device is used, the two films must be joined such that there is a predetermined gap therebetween in the center of the joined portion, which gap is a portion at which only the tape is nipped.

As illustrated in FIG. 12, a conventional splicer 100 for 135 film includes a heating head 102 which moves up and down, and a pad 104 which opposes the heating head 102. The pad 104 is formed from a fluoroplastic or the like in consideration of the heat resistance thereof and the relative ease with which tape can be peeled therefrom.

When two photographic films 106 are joined, the leading end of one photographic film 106 and the trailing end of another photographic film 106 are set on the pad 104. Splicing tape 108 is pressed and heated by the heating head 102. The paste on the splicing tape 108 thereby melts and adheres to the photographic films 106. At this time, the interval a the time of joining is a small gap of around 0.5 to 1.5 mm. Therefore, the portion of the splicing tape 108 which is positioned between the two photographic films 106 and which is not adhered to the photographic films 106 (i.e., the portion at the interval a) does not contact the pad 104, and the splicing tape 108 does not adhere to the pad 104.

However, if the interval a between the leading end of the one photographic film 106 and the trailing end of the other photographic film 106 is widened more than before, when the splicing tape 108 is heated and pressed, the portion of the splicing tape 108 between the respective end portions of the photographic films 106 which portion does not contact the photographic films 106 adheres to the pad 104 as shown in FIG. 13, and the photographic films 106 cannot be conveyed after being joined. This may be due to the fact that the splicing tape 108 is pressed against the pad 104 because high pressure is applied thereto (e.g., 50 to 200 kg).

Further, in the splicer 100 for 135 films, the joined portion is positioned by the number of perforations being counted and conveying being stopped at a predetermined position.

However, the intervals between the perforations in a photographic film used in the new type of photographic film cartridge are wide, and perforations are only formed in the vicinities of the image frames. Further, the perforations correspond to the image frames, and the respective distances from the perforations to the leading and trailing ends of the films are not always precise. Moreover, the respective configurations of the leading ends and the trailing ends of such photographic films are complex, and positioning cannot be effected by counting the number of perforations. It is extremely difficult to accurately position the leading ends and trailing ends of the films when also taking into account the meandering of the photographic films during the conveying thereof.

SUMMARY OF THE INVENTION

In view of the aforementioned, an object of the present invention is to provide a splicer and a splicing method in which the leading end of a photographic film and the trailing end of another photographic film can be accurately joined together with a predetermined interval therebetween, without resulting in any complications in the conveying of the photographic films.

Another object of the present invention is to automatically and precisely place the position of the leading end of a photographic film at a predetermined position on a pad.

Yet another object of the present invention is to automatically and precisely place the position of the trailing end of a photographic film at a predetermined position on a pad.

A first aspect of the present invention is a splicer for joining, by hot-melt adhesive tape, a trailing end portion of a first photographic film and a leading end portion of a second photographic film with a predetermined interval therebetween, comprising: a head which heats the hot-melt adhesive tape; a pad, the trailing end portion of the first photographic film and the leading end portion of the second photographic film and the hot-melt adhesive tape being held at a predetermined pressure between the pad and the head; and an adhesion preventing means provided at at least one of the pad and the head so as to oppose a portion of the hot-melt adhesive tape which portion is positioned at a gap between the trailing end portion of the first photographic film and the leading end portion of the second photographic film, the adhesion preventing means preventing adhesion of the hot-melt adhesive tape to the pad.

In accordance with the splicer of the above-described aspect, the trailing end portion of the first photographic film and the leading end portion of the second photographic film are nipped at a predetermined pressure between the head and the pad and are adhered by the hot-melt adhesive tape. At the time of this adhering, adhesion to the pad of the portion of the hot-melt adhesive tape which portion is positioned at the gap between the leading end and the trailing end is prevented by the working of the adhesion preventing means. Because the adhesion preventing means is provided, even if the gap between the trailing end portion of the first photographic film and the leading end portion of the second photographic film is large, adhesion of the portion of the hot-melt adhesive tape to the pad can be prevented.

As a result, complications in conveying when the photographic films are successively conveyed in order to connect a plurality of photographic films in a series at the splicer can be prevented. Note that it is preferable that the pad is formed of a stick-resistant material such as teflon or the like.

The adhesion preventing means may be provided with a concave portion which is formed in the pad and/or the head and which opposes the portion of the hot-melt adhesive tape. In this way, the pad and/or the head can be made a noncontact portion which substantially does not contact the portion of the hot-melt adhesive tape.

The adhesion preventing means may be a pressure reducing means which is provided at the pad and which reduces the pressure acting on the portion of the hot-melt adhesive tape when the trailing end portion of the first photographic film, the leading end portion of the second photographic film and the hot-melt adhesive tape are nipped between the pad and the head.

The pressure reducing means may be provided with an opposing surface member which opposes the portion of the hot-melt adhesive tape which portion is positioned at the gap. The opposing surface member may be supported by a spring means so that the opposing surface member is pushed into the pad when pressed.

The pressure reducing means may be provided with an opposing surface which opposes the portion of the hot-melt adhesive tape which portion is positioned at the gap. The opposing surface may be provided with at least one groove so that the contact surface area with the portion of the hot-melt adhesive tape positioned at the gap can be reduced. By reducing the contact surface area in this manner, the portion of the hot-melt adhesive tape and the opposing surface can be easily separated.

Further, the pressure reducing means may be provided with an opposing surface which opposes the portion of the hot-melt adhesive tape which portion is positioned at the gap. The opposing surface may be provided with at least one concave portion so that the contact surface area with the portion of the hot-melt adhesive tape positioned at the gap can be reduced. By reducing the contact surface area in this manner, the portion of the hot-melt adhesive tape and the opposing surface can be easily separated. It is preferable that the surface of the opposing surface is a stick-resistant material such as teflon or the like.

The adhesion preventing means may include a separating means which is provided at the pad and which jets air to the portion of the hot-melt adhesive tape so as to separate the portion of the hot-melt adhesive tape and the pad when the portion of the hot-melt adhesive tape and the pad contact each other.

The adhesion preventing means may include a contact surface area reducing means which is provided at the pad and which makes a surface area, per unit surface area, of contact of the portion of the hot-melt adhesive tape with the pad smaller than a surface area, per unit surface area, of contact of other portions of the hot-melt adhesive tape with the trailing end portion of the first photographic film and the leading end portion of the second photographic film.

The splicer of the first aspect may further comprise: a notch detecting sensor provided so as to be separated from a predetermined position of the pad by a first predetermined distance along a conveying direction of the second photographic film, the notch detecting sensor detecting a notch which is formed in the second photographic film, a dimension from the leading end portion of the second photographic film to the notch being predetermined; and film leading end portion positioning means for, when the notch is detected by the notch detecting sensor, calculating a distance from the leading end portion of the second photographic film to the predetermined position of the pad, and conveying the second photographic film on the basis of results of calculation such that the leading end portion of the second photographic film is conveyed to the predetermined position of the pad. In accordance with this splicer, the notch, whose dimension from the leading end portion of the second photographic film is set accurately, is detected by the notch detecting sensor. The film leading end portion positioning means places the position of the leading end portion of the second photographic film automatically and precisely at the predetermined position of the pad.

The splicer of the first aspect may further comprise: a positioning hole detecting sensor provided so as to be separated from a predetermined position of the pad by a second predetermined distance along a conveying direction of the first photographic film, the positioning hole detecting sensor detecting a positioning hole which is formed in the first photographic film, a dimension from the trailing end portion of the first photographic film to the positioning hole being predetermined; and film trailing end portion positioning means for, when the positioning hole is detected by the positioning hole detecting sensor, calculating a distance from the trailing end portion of the first photographic film to the predetermined position of the pad, and conveying the first photographic film on the basis of the results of calculation such that the trailing end portion of the first photographic film is conveyed to the predetermined position of the pad. In accordance with this splicer, the positioning hole, whose dimension from the trailing end portion of the first photographic film is set accurately, is detected by the positioning hole detecting sensor. On the basis of the detection by the positioning hole detecting sensor, the trailing end portion of the first photographic film can automatically and precisely be placed at the predetermined position of the pad.

The splicer of the first aspect may further comprise: a notch detecting sensor provided so as to be separated from a predetermined position of the pad by a first predetermined distance along a conveying direction of the first photographic film, the notch detecting sensor detecting a notch which is formed in the first photographic film, a dimension from a leading end portion of the first photographic film to the notch being predetermined; and film trailing end portion positioning means for, when the notch is detected by the notch detecting sensor, calculating a distance from the leading end portion of the first photographic film to the predetermined position of the pad, and conveying the first photographic film on the basis of the results of calculation such that a trailing end portion of the first photographic film is conveyed to the predetermined position of the pad. In accordance with this splicer, the notch, whose dimension from the leading end portion of the first photographic film is set accurately, is detected by the notch detecting sensor. The trailing end portion positioning means conveys the first photographic film and positions the trailing end portion thereof automatically and precisely at the predetermined position of the pad.

A second aspect of the present invention is a splicer for joining, by hot-melt adhesive tape, a longitudinal direction trailing end portion of a first photographic film and a longitudinal direction leading end portion of a second photographic film with a predetermined interval therebetween, comprising: a head which heats the hot-melt adhesive tape; a pad, the longitudinal direction trailing end portion of the first photographic film and the longitudinal direction leading end portion of the second photographic film and the hot-melt adhesive tape being held at a predetermined pressure between the pad and the head; and separating means provided at the pad so as to be positioned at a gap between the longitudinal direction trailing end portion of the first photographic film and the longitudinal direction leading end portion of the second photographic film, the separating means separating from the gap the longitudinal direction trailing end portion of the first photographic film and/or the longitudinal direction leading end portion of the second photographic film contacting the gap.

The separating means of the second aspect may include an air jetting means for jetting air toward a portion of the hot-melt adhesive tape which portion is positioned at the gap so as to separate the portion of the hot-melt adhesive tape which portion is positioned at the gap from the pad.

The separating means of the second aspect may include a pin projecting means for projecting pins toward a portion of the hot-melt adhesive tape which portion is positioned at the gap so as to separate the portion of the hot-melt adhesive tape which portion is positioned at the gap from the pad.

A third aspect of the present invention is a method of splicing photographic films comprising the steps of: conveying a first photographic film and stopping the first photographic film so that a trailing end portion thereof is stopped at a predetermined position of a pad; conveying a second photographic film and stopping the second photographic film so that a leading end portion thereof is stopped at a position which is located a predetermined dimension from the predetermined position of the pad at a conveying direction upstream side of the predetermined position of the pad; disposing hot-melt adhesive tape to bridge between the trailing end portion and the leading end portion; and nipping the trailing end portion and the leading end portion and the hot-melt adhesive tape at a predetermined pressure between the pad and a heated head, and preventing adhesion to the pad of a portion of the hot-melt adhesive tape which portion is positioned at a gap between the trailing end portion and the leading end portion.

A fourth aspect of the present invention is a method of splicing photographic films comprising the steps of: conveying a first photographic film and stopping the first photographic film so that a trailing end portion thereof is stopped at a predetermined position of a pad; conveying a second photographic film and stopping the second photographic film so that a leading end portion thereof is stopped at a position which is located a predetermined dimension from the predetermined position of the pad at a conveying direction upstream side of the predetermined position of the pad; disposing hot-melt adhesive tape to bridge between the trailing end portion and the leading end portion; nipping the trailing end portion and the leading end portion and the hot-melt adhesive tape at a predetermined pressure between the pad and a heated head, so as to connect the trailing end portion and the leading end portion by the hot-melt adhesive tape; and separating from the pad a portion of the hot-melt adhesive tape which portion is positioned at a gap between the trailing end portion and the leading end portion.

In accordance with the splicing methods of the third and fourth aspects, first, the first photographic film is conveyed and the trailing end portion thereof is stopped at a predetermined position of the pad. The second photographic film is conveyed and the leading end portion thereof is stopped at a position which is a predetermined dimension from the predetermined position of the pad at the upstream side thereof in the conveying direction. Thereafter, the hot-melt adhesive tape is disposed so as to bridge between the trailing end portion and the leading end portion. The trailing end portion, the leading end portion and the hot-melt adhesive tape are nipped at a predetermined pressure between the pad and the heated head. The trailing end portion of the first photographic film and the leading end portion of the second photographic film are thereby joined by the hot-melt adhesive tape with a predetermined interval therebetween.

In the third aspect, when the trailing end portion, the leading end portion and the hot-melt adhesive tape are nipped between the pad and the heated head, adhesion of the portion of the hot-melt adhesive tape to a portion of the pad which corresponds to the portion of the hot-melt adhesive tape is prevented. Therefore, unsatisfactory conveying of photographic films when a plurality of photographic films are successively conveyed in order to be joined in a series can be prevented.

In the fourth aspect, the trailing end portion, the leading end portion and the hot-melt adhesive tape are nipped between the pad and the heated head, and the trailing end portion and the leading end portion are joined by the hot-melt adhesive tape. Thereafter, the portion of the hot-melt adhesive tape and a portion of the pad corresponding to the portion of the hot-melt adhesive tape are separated. As a result, complications in the conveying of photographic films when a plurality of photographic films are successively conveyed in order to be joined in a series can be prevented.

BRIEF DESCRIPTION OF THE DRAWINGS

FIG. 3 is a schematic structural view of a splicer relating to the present embodiment.

FIG. 9 is a longitudinal sectional view of a head portion relating to another embodiment.

DESCRIPTION OF THE PREFERRED EMBODIMENTS

[First Embodiment]

Hereinafter, a first embodiment of a splicer of the present invention will be described with reference to the accompanying drawings.

Figure 2:
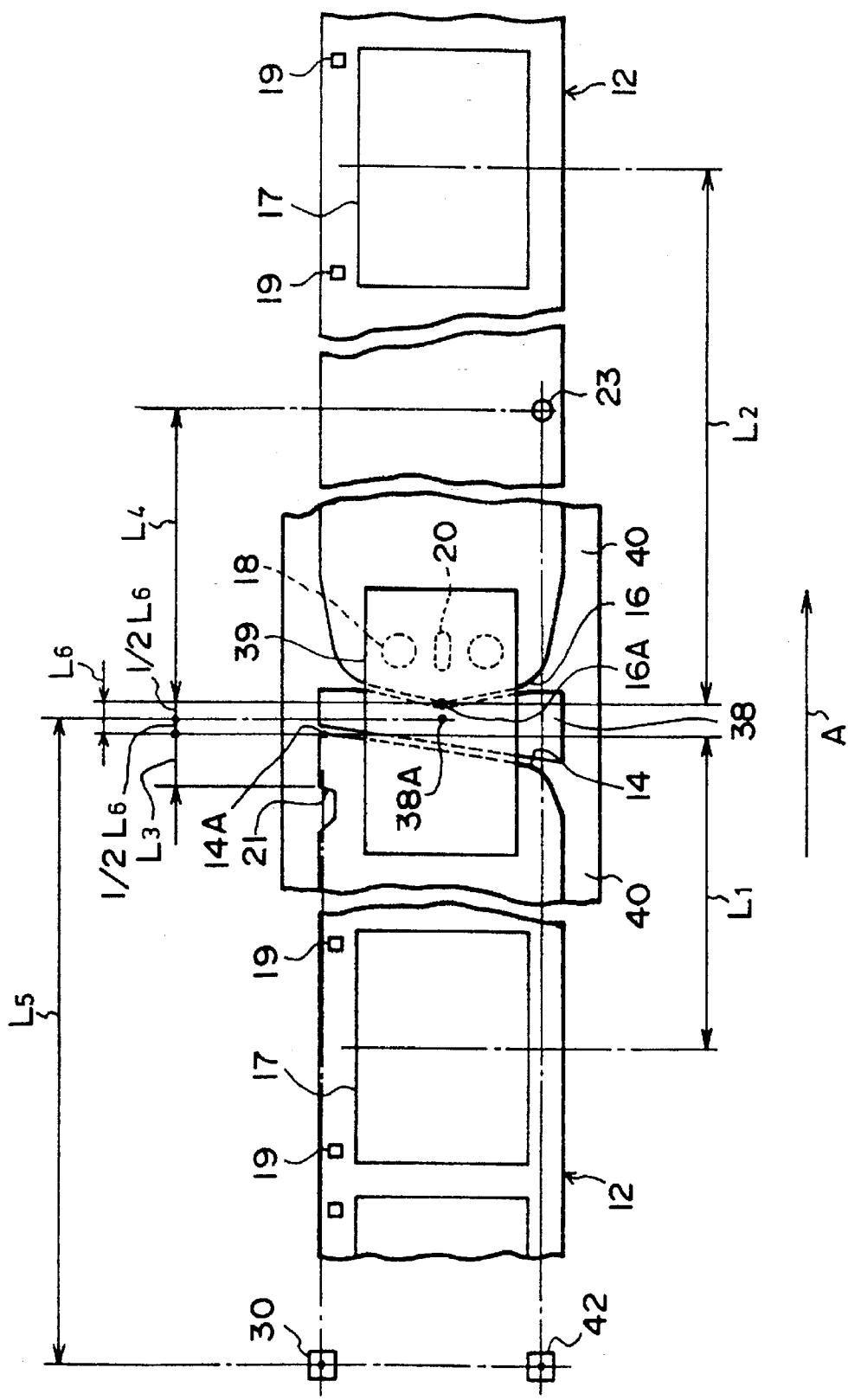
FIG. 2 is a plan view illustrating a state in which a joining portion of the films is positioned on the pad.

As illustrated in FIG. 2, the leading ends and trailing ends of films 12 to which the present embodiment is applied have undergone a special processing. Namely, a leading end portion 14 of the film 12 is cut so that the end surface thereof is angled. Further, a trailing end portion 16 (the side which engages with a spool of a cartridge) is cut so that the end surface thereof is formed in a multi-step taper shape.

At the film 12, a dimension L1 from a forwardmost end portion 14A of the leading end portion 14 to the center of a frame 17 at the leading end portion 14 side is approximately 170 mm. A dimension L2 from a rearmost end portion 16A of the trailing end portion 16 to the center of the frame 17 at the trailing end portion 16 side is approximately 150 mm.

Substantially square perforations 19 are formed in one side portion of the film 12 in vicinities of the end portions of the frames 17 in the longitudinal direction of the film 12.

A notch 21 is formed in one side portion of the film 12 at the leading end portion 14 side. A dimension L3 from the forwardmost end portion 14A of the leading end portion 14 to the notch 21 is 5 mm. When the film 12 is cut from a longer film roll material, the notch 21 is cut together with the leading end portion 14 by the same cutter. The position of the notch 21 from the leading end portion 14 (including the forwardmost end portion 14A) can thereby be set very precisely.

A pair of circular holes 18 is formed in a vicinity of the rearmost end portion 16A at the trailing end portion 16 side of the film 12. An elongated hole 20 is formed between the circular holes 18. Further, in the trailing end portion 16 side of the film 12, a circular positioning hole 23 is formed in a vicinity of the side portion which is opposite the side in which the notch 21 is formed. A dimension L4 from the rearmost end portion 16A to the positioning hole 23 is 43 mm. When the film 12 is cut from a longer film roll material, the circular positioning hole 23 is cut together with the trailing end portion 16. The position of the positioning hole 23 from the trailing end portion 16 (including the rearmost end portion 16A) can thereby be set very precisely.

Due to the rotation of a spool provided in a cartridge (both omitted from the figures), the angled surface portion of the leading end portion 14 of the film 12 is guided by a guide member within the spool so as to exit from a pull-out opening of the cartridge. Further, the circular holes 18 of the trailing end portion 16 of the film 12 engage pawls or the like provided on the spool without the trailing end portion 16 being joined to the spool by tape or the like. Accordingly, the film 12 can be easily separated from the cartridge by the engaged state of the pawls and the circular holes 18 being canceled.

Further, after the film 12 has been developed, by attaching a jig to the elongated hole 20 and inserting the trailing end portion 16 into the pull-out opening of the cartridge, the circular holes 18 can engage the pawls again, and the developed film 12 can be wound onto the spool.

Because the films 12 used in the present embodiment have been subject to special processing, the films 12 are joined as they are in their original forms without the leading and trailing ends thereof being cut to facilitate joining.

As illustrated in FIG. 3, a splicer 10 of the present embodiment includes a roller group 26 formed of a pair of small-diameter rollers 22, 24. The roller group 26 can be rotated in the directions of arrows B in FIG. 3 by a driving means 27, so that the film 12 can be nipped between the small-diameter rollers 22, 24 and conveyed in the direction of arrow A. A pulse motor or a servo motor having an encoder is used for the driving means 27. The driving means 27 is connected to a control device 29 such as a computer or the like so that the driving thereof is controlled.

Guide plates 28 corresponding to the front and reverse surfaces of the film 12 are disposed at the arrow A direction side of the roller group 26. As illustrated in FIGS. 2 and 3, transmission-type infrared ray sensors 30, 42, in which a light-emitting portion and a light-receiving portion are disposed so as to oppose each other across the conveying path of the film 12, are provided at the arrow A direction side of the guide plates 28.

As shown in FIG. 2, the transmission-type infrared ray sensor 30 is provided at a position by which the notch 21 passes, whereas the transmission-type infrared ray sensor 42 is provided at a position by which the circular positioning hole 23 passes. The transmission-type infrared ray sensors 30, 42 are connected to the control device 29.

As illustrated in FIG. 3, a joining section 32 is provided at the arrow A direction side of the transmission-type infrared ray sensors 30, 42. In the joining section 32, a head portion 34 is disposed so as to oppose one surface of the film 12 (the top surface in FIG. 3), whereas a pad 36 is disposed so as to oppose the other surface of the film 12 (the bottom surface in FIG. 3).

The head portion 34 is attached to the leading end portion of a rod 37A of a cylinder 37 which is driven by the suction and exhaust of air or the like. The driving of the cylinder 37 is controlled at the control device 29. In this way, the head portion 34 can approach or move away from the film 12. The head portion 34 is heated to a predetermined temperature by an unillustrated heating means.

Figure 1:
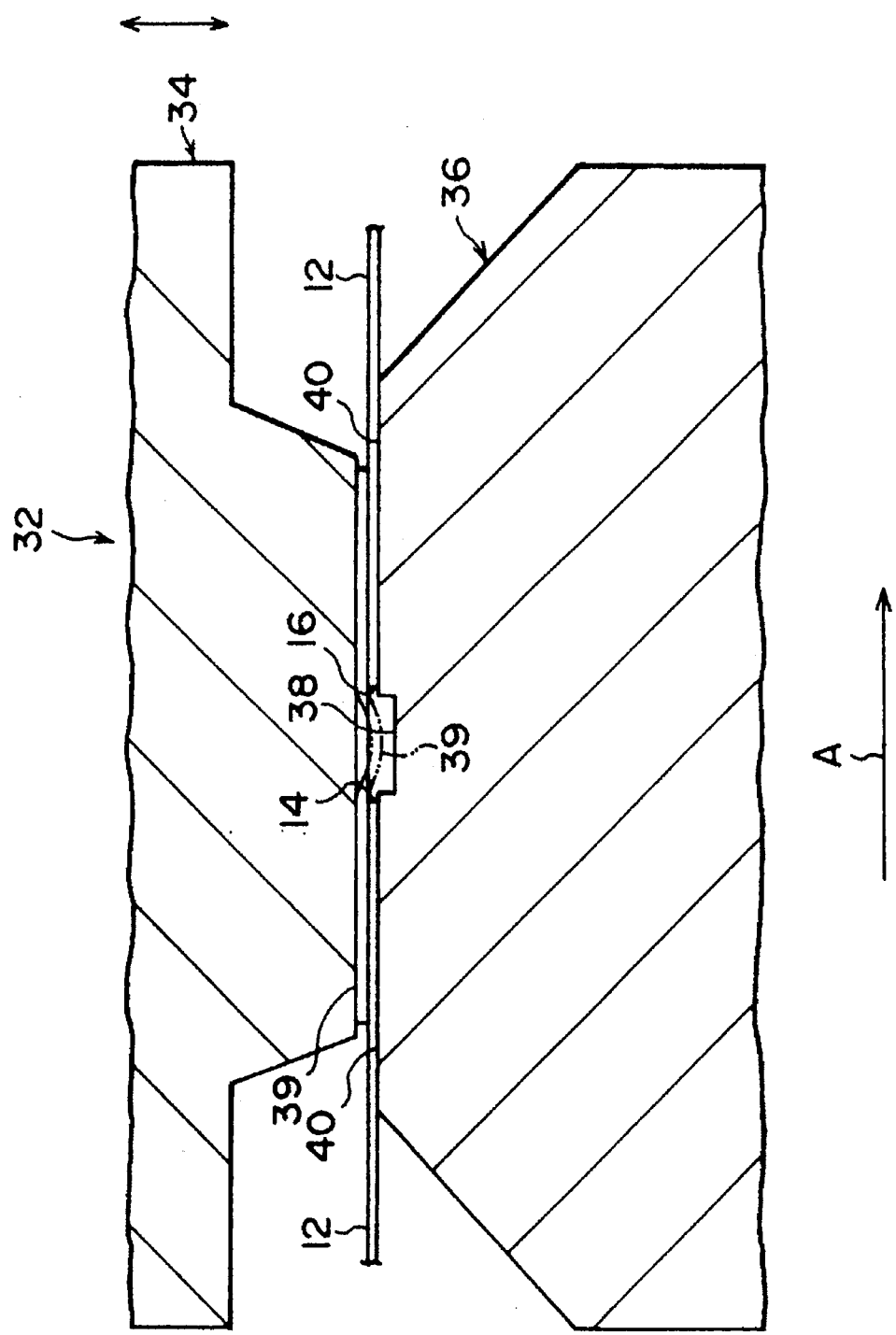
FIG. 1 is a side view illustrating a state in which a leading end of a film and a trailing end of another film are positioned on a pad and nipped by a head portion.

As illustrated in FIGS. 1 and 2, a concave portion 38 is formed in a top central portion of the pad 36. The end portion of the concave portion 38 at the side in the direction of arrow A corresponds to the configuration of the trailing end portion 16 of the film 12, whereas the opposite side end portion of the concave portion 38 corresponds to the configuration of the leading end portion 14 of the film 12. The dimension of the concave portion 38 along the transverse direction of the film 12 is larger than the dimension of a splicing tape 39 along the transverse direction of the film 12.

The upper surface of the pad 36 (i.e., the film conveying surface side) is a film supporting surface 40, and is the region at which the leading end portion 14 and the trailing end portion 16 of the films 12 are placed when the films 12 are to be joined.

As illustrated in FIG. 2, a central point 38A of the concave portion 38 is a reference for the attachment positions of the sensors 30, 42, and is located downstream from the transmission-type infrared ray sensors 30, 42 by a predetermined dimension L5.

As illustrated in FIG. 3, a roller group 48 formed of small-diameter rollers 44, 46 is disposed at the arrow A direction side of the joining section 32. The roller group 48 is driven by a driving means 49, and can rotate in forward and reverse directions as shown by arrows C in FIG. 3. The film 12 is nipped between the small-diameter rollers 44, 46 of the roller group 48 and can be conveyed in the direction of arrow A or in the direction opposite thereto. A pulse motor or a servo motor having an encoder is used for the driving means 49 which drives the roller group 48. The driving means 49 is connected to the control device 29 so that the driving thereof is controlled.

A roller group 56, which is formed by small-diameter rollers 52, 54 and rotated in the directions of arrows D by a driving means 53 such as a motor or the like, is disposed at the arrow A direction side of the roller group 48. A winding section 50 for winding the film 12 is disposed even further in the direction of arrow A.

A film leading end portion positioning means is formed by the control means 29, the driving means 27 and the roller group 26. A film trailing end portion positioning means is formed by the control means 29, the driving means 27, 49, the roller group 26 and the roller group 48.

Further, in the present embodiment, the driving means 27, 29, 53 are connected to and rotate the rollers 24, 46, 54, respectively. In contrast, the rollers 22, 44, 52 are idle rollers which receive and are rotated by the rotating force of the rollers 24, 46, 54 due to contact therewith.

Processes for joining the films 12 will be described hereinafter.

First, a first negative film 12 whose leading end portion has already been joined is conveyed in the direction of arrow A by the roller group 26.

When the film 12 is conveyed, the circular positioning hole 23 is detected at the transmission-type infrared ray sensor 42. The light irradiated from the light-emitting portion of the sensor 42 is blocked by the film 12, and then is transmitted through the circular positioning hole 23 when the positioning hole 23 is positioned so as to oppose the sensor 42. Accordingly, when this light is detected at the light-receiving portion, it can be determined that the circular positioning hole 23 is passing by the position of the sensor When the circular positioning hole 23 is detected, the control device 29 controls the rotational frequency of the roller group 48 so that the film 12 is conveyed in the direction of arrow A over a distance equal to L5+½ L6 +L4. In this way, the trailing end portion 16 of the first film 12 is positioned at a predetermined position of the pad 36 (see FIG. 2).

After the trailing end portion 16 of the first film (the film 12 at the right side in FIG. 2) has been positioned, the second film 12 which is to be joined with the first film 12 is conveyed. In the same way as the first film 12, the second film 12 is conveyed in the direction of arrow A by the roller group 26.

When the second film 12 is conveyed, the leading end portion 14 thereof is detected at the transmission-type infrared ray sensors 30, 42, and then the notch 21 is detected at the transmission-type infrared ray sensor 30. When the notch 21 is detected, the control device 29 controls the rotational frequency of the roller group 26 so that the second film 12 is conveyed in the direction of arrow A over a distance equal to L5–½ L6–L3. In this way, the leading end portion 14 of the second film 12 (the film 12 at the left side in FIG. 2) is positioned at a predetermined position of the pad 36, and a gap of a predetermined dimension (dimension L6) is provided between the leading end portion 14 and the trailing end portion 16.

When the leading end portion 14 and the trailing end portion 16 have been positioned, the splicing tape 39 which has been cut to a predetermined size is disposed so as to bridge between the leading end portion 14 of the second film 12 and the trailing end portion 16 of the first film 12. The splicing tape 39 can be supplied by using a commonly-known splicing tape supplying device (unillustrated) which is used in a conventional splicer for joining 135 films.

Next, the head portion 34 is lowered, and the films 12 and the splicing tape 39 are held for a predetermined period of time between the head portion 34 and the pad 36 so that the splicing tape 39 is heated. When the heated head portion 34 contacts the splicing tape 39, the paste of the splicing tape 39 softens, and adheres to the film 12 due to the applied pressure.

At this time, because only the portion of the splicing tape 39 which portion is not superposed on the films 12 opposes the concave portion 38, contact of this portion of the splicing tape 39 with the pad 36 is avoided. (Even if the splicing tape 39 were to deform as illustrated by the two-dot chain line in FIG. 1, the splicing tape 39 would not contact the pad 36 due to the depth of the concave portion 38.) Even if the splicing tape 39 were to contact the pad 36, the splicing tape would not adhere to the pad 36 because pressure of the head portion 34 is not applied thereto.

After a predetermined period of time has elapsed, the head portion 34 is raised. The roller group 26 and the roller group 48 are driven. The two joined films 12 are conveyed in the direction of arrow A, and a predetermined length thereof is wound up at the winding portion 50.

The trailing end portion 16 of the second film 12 is positioned at the pad 36 in the same way as the first film 12. The leading end portion 14 of a third film 12 is positioned at the pad 36 in the same way as the leading end portion 14 of the second film 12. By repeating the above-described operations, a plurality of films 12 are joined and are wound up at the winding portion 50.

Figure 11:
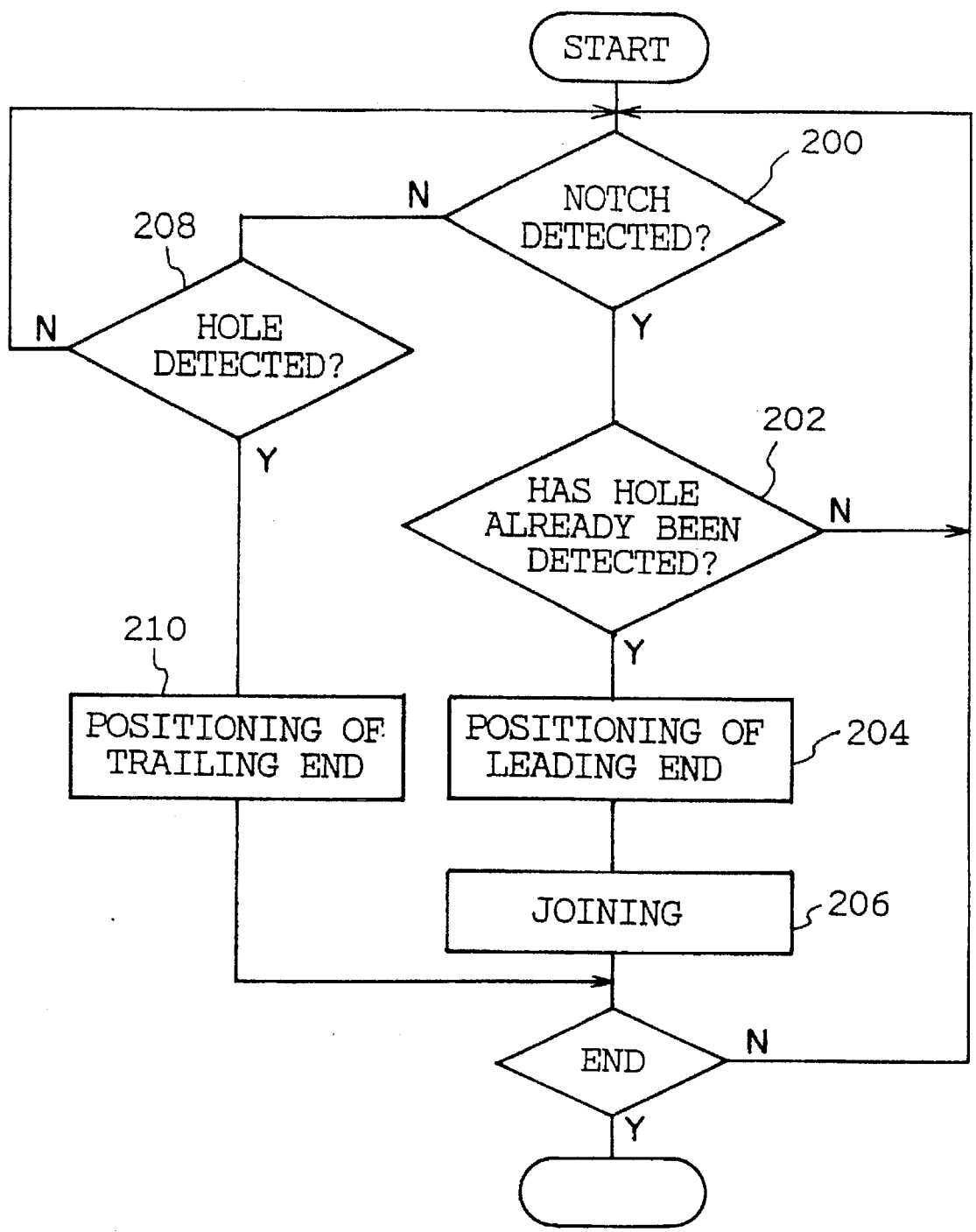
FIG. 11 is a flowchart for briefly explaining positioning of a leading end of a photographic film and a trailing end of another photographic film relating to the embodiment.
Figure 12:
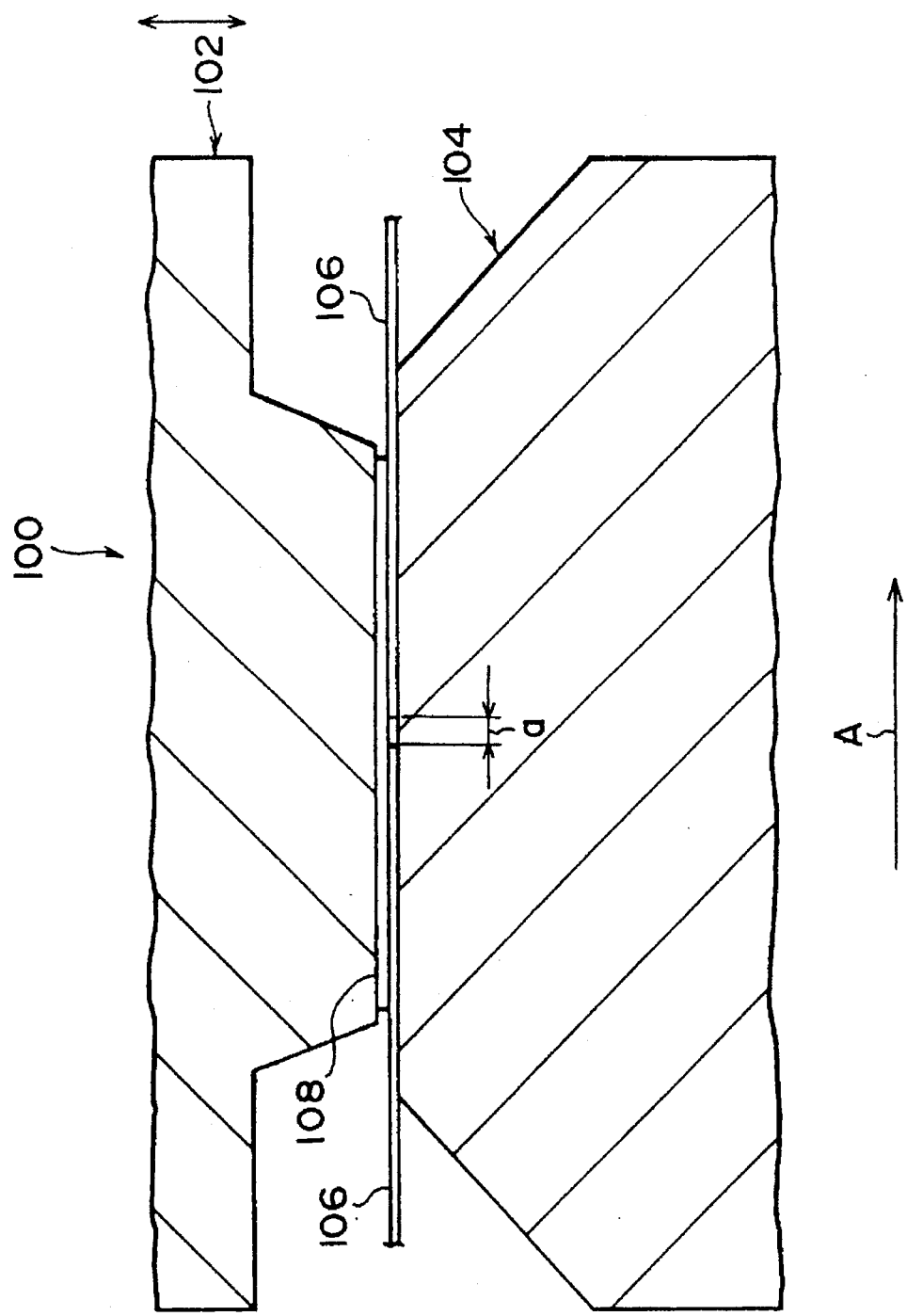
FIG. 12 is a side view illustrating a state in which two 135 films are joined at a conventional splicer.
Figure 13:
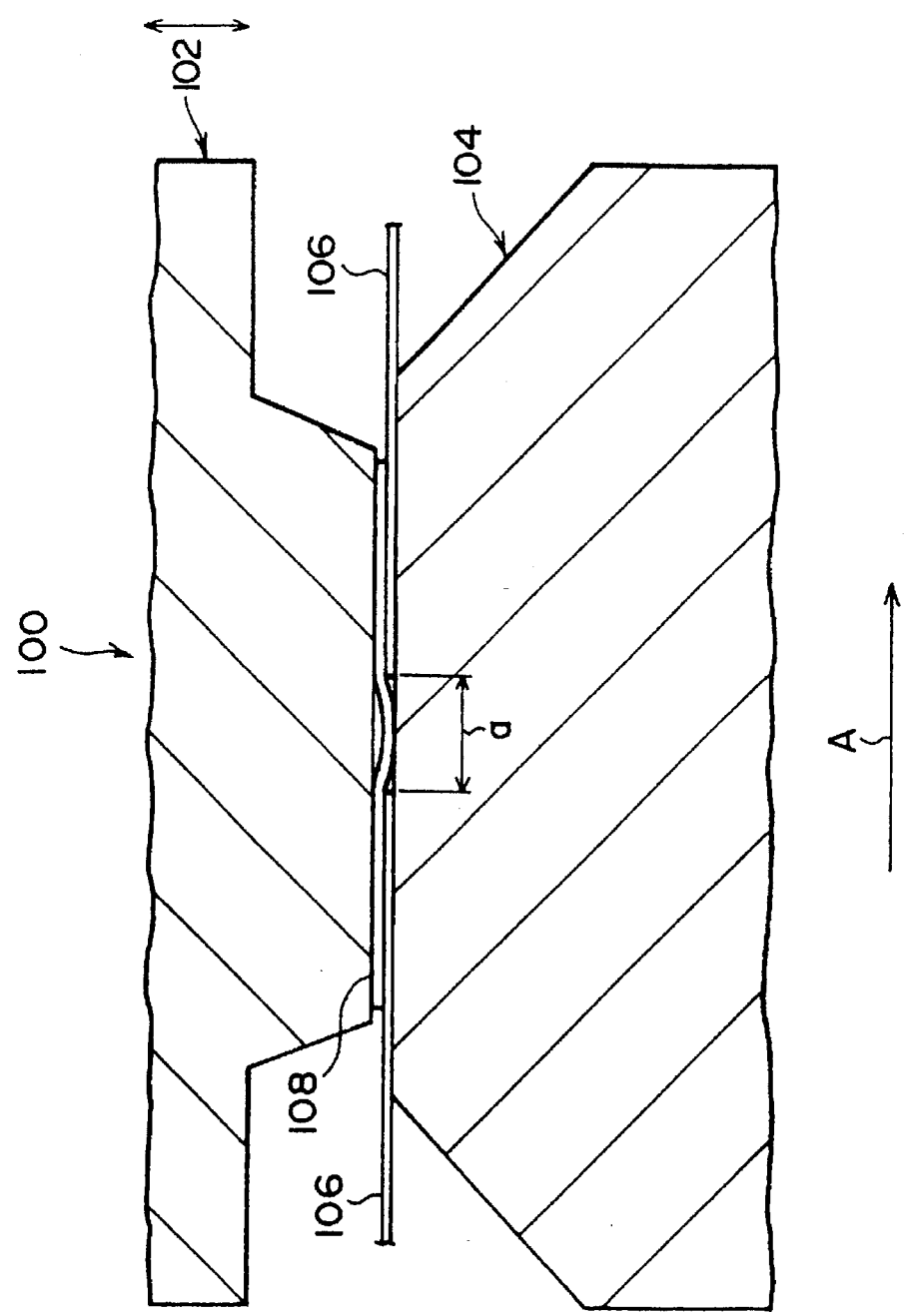
FIG. 13 is a side view illustrating a state in which two films are joined with a large interval therebetween at a conventional splicer.

Positioning of the leading end and trailing end of the photographic films 12 and joining of the films 12 by the splicing tape 39 will be briefly described in accordance with the flowchart of FIG. 11.

In step 200, a determination is made as to whether the notch 21 of the film 12 is detected by the sensor. When the answer to the determination in step 200 is "Yes", in step 202, a determination is made as to whether the hole 23 has already been detected by the sensor 42. When the answer to the determination in step 202 is "Yes", the trailing end of the other film 12 (referred to here as the "first film") has already been positioned before the present film (the "second film"), and in step 204, positioning of the leading end of the film 12 (the second film) is carried out. In step 206, the trailing end of the first film 12 and the leading end of the second film 12 are joined by the splicing tape 39. If the answer to the determination in step 200 is "No", in step 208, a determination is made as to whether the hole 23 has been detected by the sensor 42. If the answer to the determination in step 208 is "Yes", positioning of the trailing end of the film is carried out in step 210.

In this way, in the splicer 10 of the present embodiment, the concave portion 38 is provided the pad 36 so that adhesion of the splicing tape 39 to the pad 36 is prevented. Therefore, complications in the conveying of the films 12 or the like do not occur.

Further, in the present embodiment, the circular positioning hole 23 is detected, and the trailing end portion 16 of the film 12 is positioned. However, if the entire length of the film 12 is known in advance, the trailing end portion 16 can be positioned by detecting the notch 21.

[Second Embodiment]

A second embodiment of the present invention will now be described. Structures which are the same as those of the first embodiment are denoted by the same reference numerals, and description thereof is omitted.

Figure 4A:
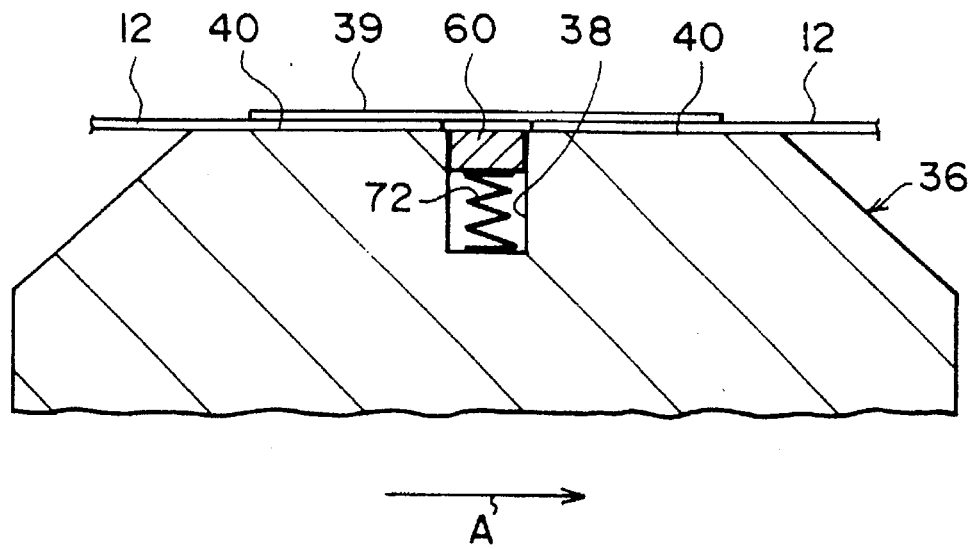
FIG. 4A is a longitudinal sectional view of a pad relating to another embodiment.

As illustrated in FIG. 4A, a concave portion 38 which is deeper than the concave portion 38 of the first embodiment is formed in the pad 36. A back pad 60 which constitutes a portion of a pressure buffer means or a pressure reducing means is disposed in the interior portion of the concave portion 38. The top surface of the back pad 60 is positioned so as to be coplanar with the film supporting surface 40. The back pad 60 is formed of a fluoroplastic, and is supported by a compression coil spring 72 which is provided at the bottom portion of the concave portion 38, has a low spring constant, and constitutes another portion of the pressure buffer means.

In the present embodiment, in the same way as in the first embodiment, even if the head portion 34 is lowered such that the films 12 and the splicing tape 39 are nipped between the head portion 34 and the pad 36, the pressure applied to the portion where there is only the splicing tape 39 is the weak pressure of only the urging force of the compression coil spring 72. Adhesion of the splicing tape 39 to the pad 36 (the back pad 60) can thereby be prevented.

Figure 4B:
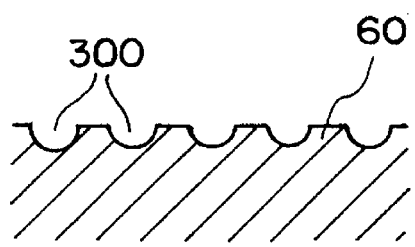
FIG. 4B is a sectional view in which a portion of a back pad is enlarged.
Figure 4D:
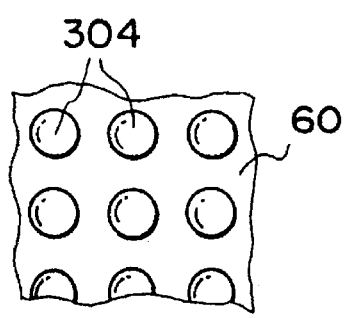
FIG. 4D is a plan view in which a portion of a back pad is enlarged.
Figure 4C:
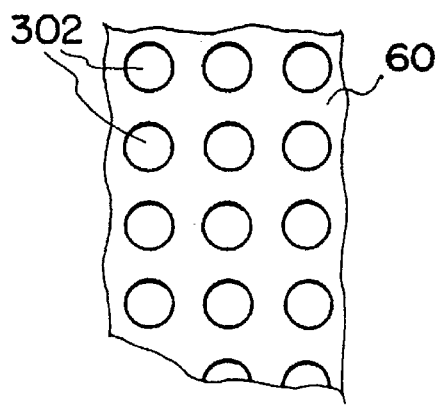
FIG. 4C is a plan view in which a portion of a back pad is enlarged.
Figure 4E:
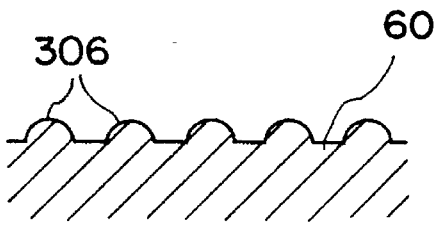
FIG. 4E is a sectional view in which a portion of a back pad is enlarged.

Further, a contact surface area reducing means may be formed in the top surface of the back pad 60. Examples of the contact surface area reducing means include a plurality of grooves 300 as illustrated in FIG. 4B, a plurality of concave portions 302 (e.g., hemispherical dimples) as illustrated in FIG. 4C, a plurality of hemispherical convex portions 304 as illustrated in FIG. 4D, a plurality of convex portions 306 shaped as half-rollers as illustrated in FIG. 4E and the like. By reducing the contact surface area with the splicing tape 39, the adhesion prevention effect can be improved even more. In cases in which the contact surface area reducing means is formed, it is preferable that the top portions of the convex portions are set so as to not protrude any further than the film supporting surface 40.

[Third Embodiment]

A third embodiment of the present invention will now be described. Structures which are the same as those of the first embodiment are denoted by the same reference numerals, and description thereof is omitted.

Figure 5:
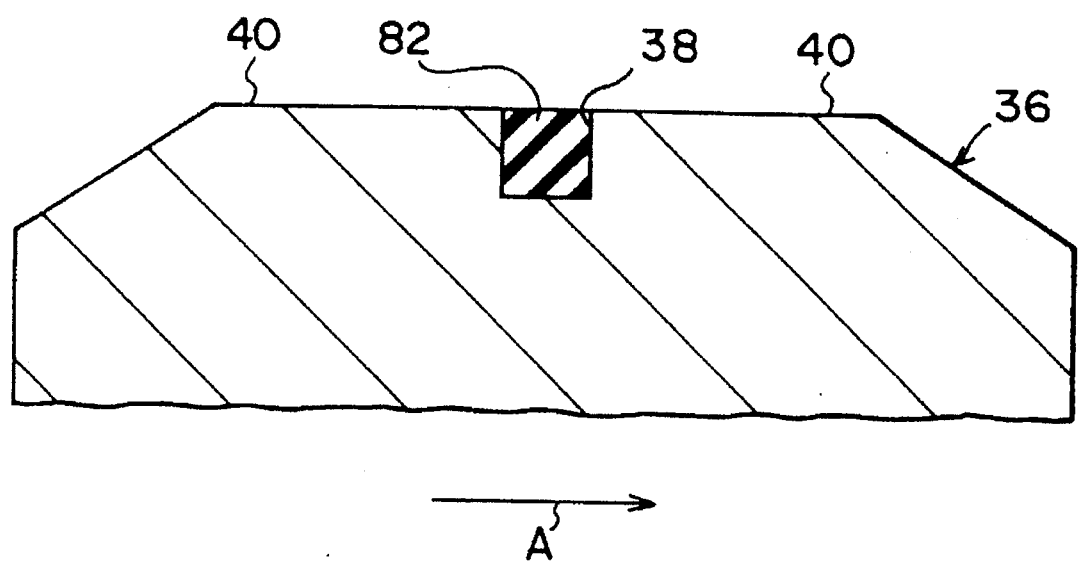
FIG. 5 is a longitudinal sectional view of a pad relating to still another embodiment.

As illustrated in FIG. 5, a soft elastic material 82, which is formed, for example, from a silicon rubber or a fluororubber (both may be sponge-like) or the like and which serves as a heat-resistant pressure buffer member, is filled in the concave portion 38 which is formed deeply into the pad 36. The top surface of the soft elastic material 82 is coplanar with the film supporting surface 40.

Accordingly, the top surface of the pad 36 is usually planar, and when pressure is applied by the head portion 34 (not illustrated in FIG. 5), only the soft elastic material 82 elastically deforms. The pressure applied to the portion where there is only the splicing tape 39 can be made very small, and in the same way as the splicer 10 of the second embodiment, adhesion of the splicing tape 39 can be prevented.

Figure 6:
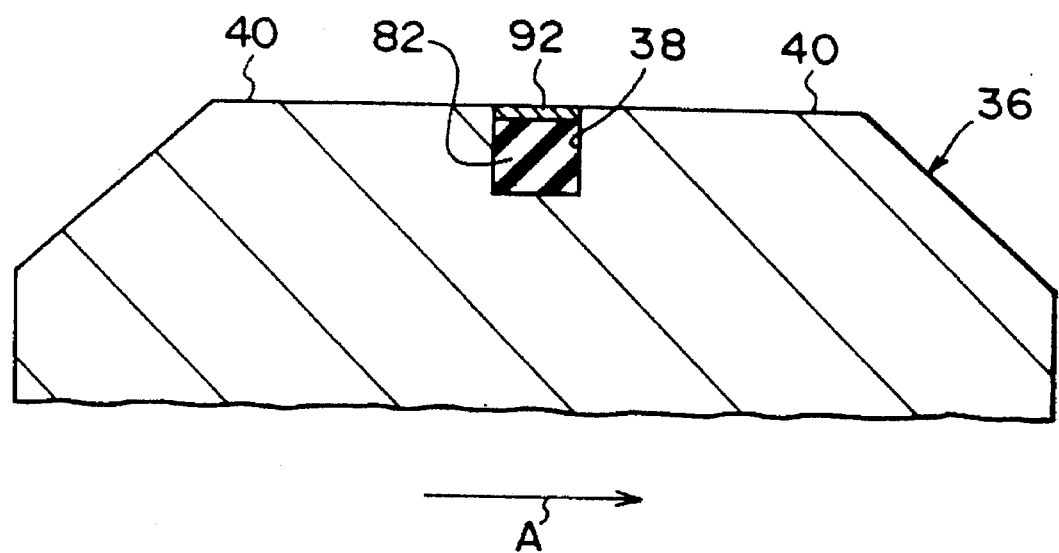
FIG. 6 is a longitudinal sectional view of a pad relating to still another embodiment.

Further, as illustrated in FIG. 6, a teflon-coated plate member 92 coated with teflon or stainless steel may be adhered to the surface layer of the soft elastic material 82 such that the surface of the plate member 92 is coplanar with the film supporting surface 40.

Further, a contact surface area reducing means such as grooves, concave portions (e.g., hemispherical concave dimples), hemispherical or roller-shaped convex portions or the like may be formed in the surface of the soft elastic material 82 or in the surface of the plate member 92. By making the contact surface area with the splicing tape 39 small, the adhesion prevention effect can be improved even more.

[Fourth Embodiment]

A fourth embodiment of the present invention will be described hereinafter. Structures which are the same as those of the first embodiment are denoted by the same reference numerals, and description thereof is omitted.

Figure 7:
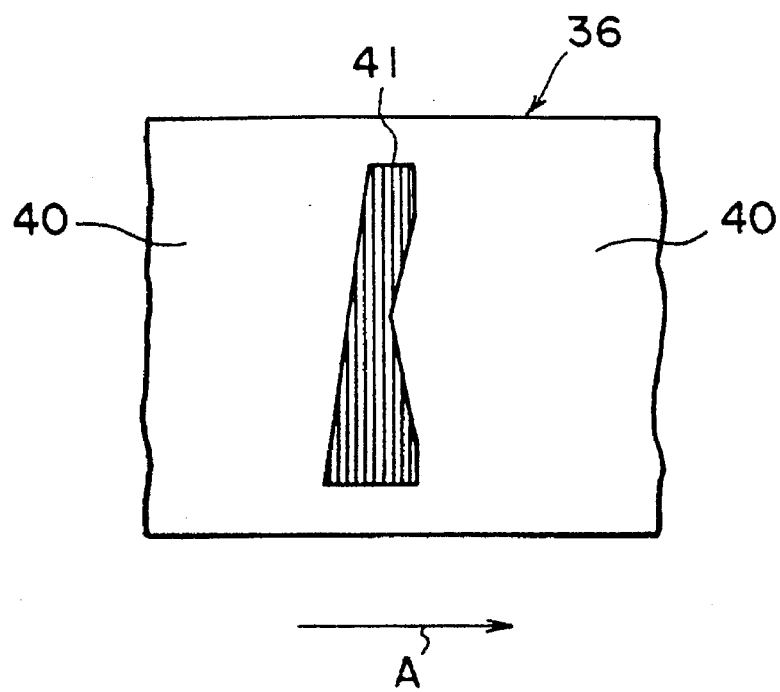
FIG. 7 is a plan view of a pad relating to still another embodiment.

As shown in FIG. 7, a contact surface area reducing means 41, for example, grooves, concave portions (e.g., hemispherical concave dimples), hemispherical or roller-shaped convex portions or the like, is formed in the pad 36 in place of the concave portion 38 of the first embodiment at a position opposed by only the splicing tape 39 (i.e., at the region indicated by hatching). The contact surface area with the splicing tape 39 can thereby be reduced. In the present embodiment, the contact surface area reducing means 41 is a plurality of thin grooves. In this way, the adhering of the splicing tape 39 to the pad 36 can be prevented.

[Fifth Embodiment]

Hereinafter, a fifth embodiment of the present invention will be described. Structures which are the same as those of the first embodiment are denoted by the same reference numerals, and description thereof is omitted.

Figure 8:
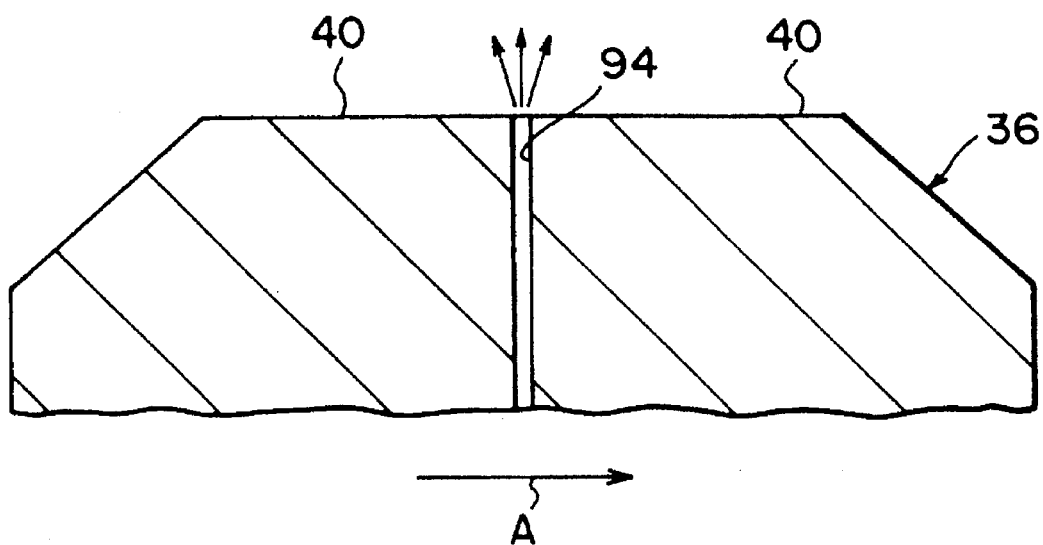
FIG. 8 is a longitudinal sectional view of a pad relating to still another embodiment.

As illustrated in FIG. 8, an air jetting hole 94 is formed in the pad 36 at a position opposed only by the splicing tape 39, such that air supplied from an unillustrated compressor can be jetted out from the air jetting hole 94. In the present embodiment, when application of pressure has been completed and the head portion 34 is moved away from the pad 36, high-pressure air is jetted out from the air jetting hole 94. In this way, even if the splicing tape 39 adheres to the pad 36, the adhered splicing tape 39 can be easily removed from the pad 36 by the jetted air.

[Sixth Embodiment]

A sixth embodiment of the present invention will now be described. Structures which are the same as those of the first embodiment are denoted by the same reference numerals, and description thereof is omitted.

As illustrated in FIG. 9, a concave portion 34A is formed in the head portion 34 at a position opposed only by the splicing tape 39.

As a result, the head portion 34 only applies pressure to the portions where the splicing tape 39 and the films 12 are superposed, and no pressure is applied to the portion where there is only splicing tape 39. Accordingly, in the present embodiment as well, the splicing tape 39 can be prevented from adhering to the pad 36.

[Seventh Embodiment]

A seventh embodiment of the present invention will be described hereinafter. Structures which are the same as those of the first embodiment are denoted by the same reference numerals, and description thereof is omitted.

Figure 10A:
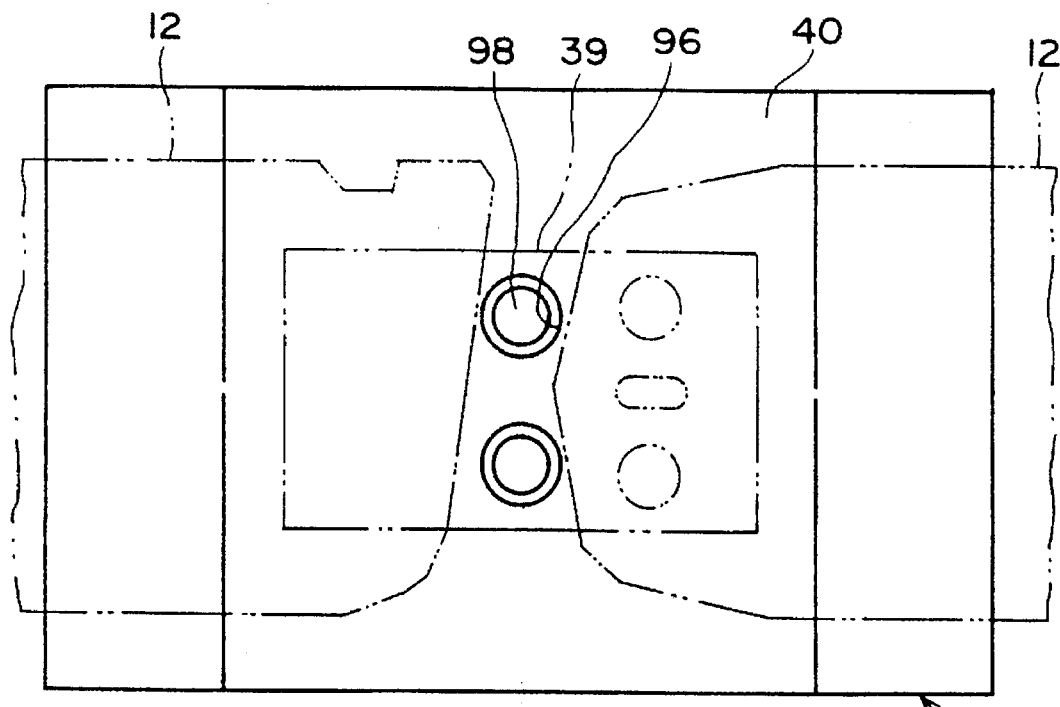
FIG. 10A is a plan view of a pad relating to still another embodiment.
Figure 10B:
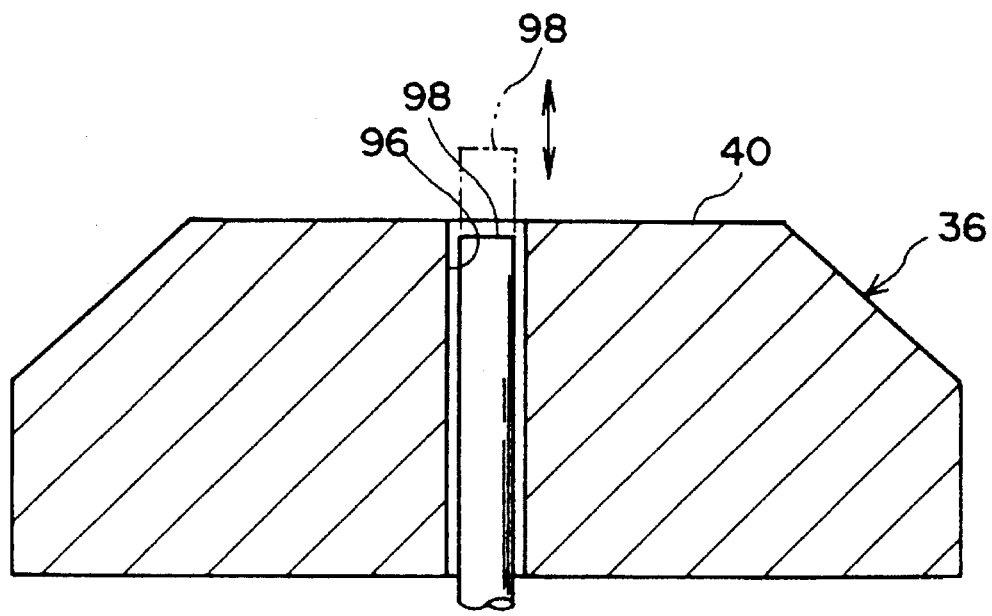
FIG. 10B is a longitudinal sectional view of the pad illustrated in FIG. 10A.

As illustrated in FIGS. 10A and 10B, a pair of holes 96 is formed in the pad 36 at a position opposed only by the splicing tape 39. Pins 98, which can project from the film supporting surface 40 due to a solenoid, a cylinder or the like (unillustrated) provided within the pad 36, are disposed in these holes 96.

In the present embodiment, the pins 98 are not projected while the films are being conveyed. When application of pressure by the head portion 34 has been completed and the head portion 34 is moved away from the pad 36, the tip ends of the pins 98 are projected upward a predetermined amount from the film supporting surface 40. Accordingly, even if the splicing tape 39 adheres to the pad 36, the adhered splicing tape 39 can be easily removed from the pad 36 by the projecting pins 98.

In the above-described embodiments, positioning of the leading end portion 14 and the trailing end portion 16 is effected by detecting the notch 21 and the circular positioning hole 23 of the film 12. However, even if the forwardmost end portion 14A of the leading end portion 14 and the rearmost end portion 16A of the trailing end portion 16 are detected, positioning of the leading end portion 14 and the trailing end portion 16 can be carried out. In this case, the transmission-type infrared ray sensor 30 may be disposed at a position by which the forwardmost end portion 14A of the leading end portion 14 passes, and the transmission-type infrared ray sensor 42 may be disposed at a position by which the rearmost end portion 16A of the trailing end portion 16 passes. Note that the elongated hole 20 passes by the position at which the transmission-type infrared ray sensor 42 is disposed. However, erroneous detection of the elongated hole 20 can be prevented by using the transmission-type infrared ray sensor 30 together with the transmission-type infrared ray sensor 42 in the following manner: the taper portion of the trailing end portion 16 is first detected at the transmission-type infrared sensor 30, and then a predetermined time thereafter, the rearmost end portion 16A of the trailing end portion 16 is detected by the transmission-type infrared ray sensor 42.

Further, instead of the transmission-type infrared ray sensors 30, 42, a line sensor, a television camera or the like which can scan the entire transverse direction region of the film 12 may be disposed at the upstream side of the joining section 32. In this way, accurate positioning of the leading end portion 14 and the trailing end portion 16 at predetermined positions of the pad 36 can also be effected by perceiving the respective configurations of the leading end portion 14 and the trailing end portion 16.

All of the dimensions of the film 12 and the like used in the above-described embodiments are mere examples. These dimensions may be varied appropriately in accordance with the design, and the present invention is not limited to these dimensions.

What is claimed is:

1. A splicer for joining, by hot-melt adhesive tape, a trailing end portion of a first photographic film and a leading end portion of a second photographic film with a predetermined interval therebetween, comprising:

a head which heats the hot-melt adhesive tape;

a pad, the trailing end portion of the first photographic film and the leading end portion of the second photographic film and the hot-melt adhesive tape being held at a predetermined pressure between said pad and said head; and an adhesion preventing means provided at said head so as to oppose a portion of the hot-melt adhesive tape which portion is positioned at a gap between the trailing end portion of the first photographic film and the leading end portion of the second photographic film, said adhesion preventing means preventing adhesion of the hot-melt adhesive tape to said pad and including a non-contact portion which is larger than the interval between the trailing end portion of the first photographic film and the leading end portion of said second photographic film and which is in a state of substantial non-contact with said portion of the hot-melt adhesive tape.

2. A splicer according to claim 1, wherein said adhesion preventing means includes a pressure reducing means which is provided at said pad and reduces said pressure.

3. A splicer according to claim 2, wherein said pressure reducing means includes an opposing surface member which opposes said portion of the hot-melt adhesive tape which portion is positioned at said gap, said opposing surface member being supported by a spring means so as to be pushed into said pad when pressed.

4. A splicer according to claim 2, wherein said pressure reducing means includes an opposing surface which opposes said portion of the hot-melt adhesive tape which portion is positioned at said gap, said opposing surface being provided with at least one groove such that a surface area of contact with said portion of the hot-melt adhesive tape which portion is positioned at said gap is reduced.

5. A splicer according to claim 2, wherein said pressure reducing means includes an opposing surface which opposes said portion of the hot-melt adhesive tape which portion is positioned at said gap, said opposing surface being provided with at least one concave portion such that a surface area of contact with said portion of the hot-melt adhesive tape which portion is positioned at said gap is reduced.

6. A splicer according to claim 1, wherein said adhesion preventing means includes a separating means which is provided at said pad and which jets air to said portion of the hot-melt adhesive tape so as to separate said portion of the hot-melt adhesive tape and said pad when said portion of the hot-melt adhesive tape and said pad contact each other.

7. A splicer according to claim 1, wherein said adhesion preventing means includes a contact surface area reducing means which is provided at said pad and which makes a surface area, per unit surface area, of contact of said portion of the hot-melt adhesive tape with a surface of said pad smaller than a surface area, per unit surface area, of contact of other portions of the hot-melt adhesive tape with the trailing end portion of the first photographic film and the leading end portion of the second photographic film.

8. A splicer according to claim 1, further comprising:

a notch detecting sensor provided so as to be separated from a predetermined position of said pad by a first predetermined distance along a conveying direction of the second photographic film, said notch detecting sensor detecting a notch which is formed in the second photographic film, a dimension from the leading end portion of the second photographic film to said notch being predetermined; and film leading end portion positioning means for, when said notch is detected by said notch detecting sensor, calculating a distance from the leading end portion of the second photographic film to the predetermined position of said pad, and conveying the second photographic film on the basis of results of calculation such that the leading end portion of the second photographic film is conveyed to the predetermined position of said pad.

9. A splicer according to claim 1, further comprising:

a positioning hole detecting sensor provided so as to be separated from a predetermined position of said pad by a second predetermined distance along a conveying direction of the first photographic film, said positioning hole detecting sensor detecting a positioning hole which is formed in the first photographic film, a dimension from the trailing end portion of the first photographic film to said positioning hole being predetermined; and film trailing end portion positioning means for, when said positioning hole is detected by said positioning hole detecting sensor, calculating a distance from the trailing end portion of the first photographic film to the predetermined position of said pad, and conveying the first photographic film on the basis of the results of calculation such that the trailing end portion of the first photographic film is conveyed to the predetermined position of said pad.

10. A splicer according to claim 8, further comprising:

a positioning hole detecting sensor provided so as to be separated from a predetermined position of said pad by a second predetermined distance along a conveying direction of the first photographic film, said positioning hole detecting sensor detecting a positioning hole which is formed in the first photographic film, a dimension from the trailing end portion of the first photographic film to said positioning hole being predetermined; and film trailing end portion positioning means for, when said positioning hole is detected by said positioning hole detecting sensor, calculating a distance from the trailing end portion of the first photographic film to the predetermined position of said pad, and conveying the first photographic film on the basis of the results of calculation such that the trailing end portion of the first photographic film is conveyed to the predetermined position of said pad.

11. A splicer according to claim 1, further comprising:

a notch detecting sensor provided so as to be separated from a predetermined position of said pad by a first predetermined distance along a conveying direction of the first photographic film, said notch detecting sensor detecting a notch which is formed in the first photographic film, a dimension from a leading end portion of the first photographic film to said notch being predetermined; and film trailing end portion positioning means for, when said notch is detected by said notch detecting sensor, calculating a distance from the leading end portion of the first photographic film to the predetermined position of said pad, and conveying the first photographic film on the basis of the results of calculation such that a trailing end portion of the first photographic film is conveyed to the predetermined position of said pad.

12. A splicer for joining, by hot-melt adhesive tape, a longitudinal direction trailing end portion of a first photographic film and a longitudinal direction leading end portion of a second photographic film with a predetermined interval therebetween, comprising:

a head which heats the hot-melt adhesive tape;

a pad, the longitudinal direction trailing end portion of the first photographic film and the longitudinal direction leading end portion of the second photographic film and the hot-melt adhesive tape being held at a predetermined pressure between said pad and said head; and separating means provided at said pad so as to be positioned at a gap between the longitudinal direction trailing end portion of the first photographic film and the longitudinal direction leading end portion of the second photographic film, said separating means separating from said gap at least one of the longitudinal direction trailing end portion of the first photographic film and the longitudinal direction leading end portion of the second photographic film contacting said gap, wherein said separating means includes an air jetting means for jetting air toward a portion of the hot-melt adhesive tape which portion is positioned at said gap so as to separate said portion of the hot-melt adhesive tape which portion is positioned at said gap from said pad.

13. A splicer for joining, by hot-melt adhesive tape, a longitudinal direction trailing end portion of a first photographic film and a longitudinal direction leading end portion of a second photographic film with a predetermined interval therebetween, comprising:

a head which heats the hot-melt adhesive tape;

a pad, the longitudinal direction trailing end portion of the first photographic film and the longitudinal direction leading end portion of the second photographic film and the hot-melt adhesive tape being held at a predetermined pressure between said pad and said head; and separating means provided at said pad so as to be positioned at a gap between the longitudinal direction trailing end portion of the first photographic film and the longitudinal direction leading end portion of the second photographic film, said separating means separating from said gap at least one of the longitudinal direction trailing end portion of the first photographic film and the longitudinal direction leading end portion of the second photographic film contacting said gap, wherein said separating means includes a pin projecting means for projecting pins toward a portion of the hot-melt adhesive tape which portion is positioned at said gap so as to separate said portion of the hot-melt adhesive tape which portion is positioned at said gap from said pad.

14. A splicer according to claim 1, wherein said non-contact portion is formed in a generally trapezoidal configuration conforming to the trailing end portion and the leading end portion.

* * * * *